(12) United States Patent
Maki (10) Patent No.: US 8,064,095 B2
(45) Date of Patent: Nov. 22, 2011

(54) METHOD OF GENERATING INK AMOUNT DATA, DEVICE FOR GENERATING INK AMOUNT DATA, AND PROGRAM THEREOF

(75) Inventor: Yoichiro Maki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 351 days.

(21) Appl. No.: 12/372,799

(22) Filed: Feb. 18, 2009

(65) Prior Publication Data

US 2009/0207197 A1    Aug. 20, 2009

(30) Foreign Application Priority Data

Feb. 18, 2008 (JP) ................................. 2008-035635

(51) Int. Cl.
*G06K 15/02* (2006.01)
*G06F 15/00* (2006.01)

(52) U.S. Cl. .......................................... 358/1.2; 358/1.9

(58) Field of Classification Search ........................ None
See application file for complete search history.

(56) References Cited

U.S. PATENT DOCUMENTS

| 6,580,822 | B1 * | 6/2003 | Takei ............................ 382/162 |
| 6,681,041 | B1 * | 1/2004 | Stokes et al. ................... 382/164 |
| 2003/0118231 | A1 * | 6/2003 | Uchida et al. .................. 382/164 |
| 2006/0203270 | A1 * | 9/2006 | Shirasawa ...................... 358/1.9 |

FOREIGN PATENT DOCUMENTS

JP         10-200769        7/1998
JP       2005-324459 A     11/2005

* cited by examiner

*Primary Examiner* — Twyler Haskins
*Assistant Examiner* — Barbara Reinier
(74) *Attorney, Agent, or Firm* — Nutter McClennen & Fish LLP; John J. Penny, Jr.; Christina M. Sperry (57) ABSTRACT

Provided is a method of generating ink amount data which is the used amounts of inks of respective colors when an image is printed, by analyzing image data of the image, the method including: extracting a character area, of which a saturation value is equal to or less than a predetermined value, from the image by analyzing the image data; dividing the character area into a character contour area which is a contour part of the character and a character inside area which is the inside of the character; and converting the image data of the character contour area and the image data of the character inside area into the ink amount data of at least one type of achromatic color ink and at least three types of chromatic color inks, wherein the converting of the ink amount data includes converting the image data of the areas into the ink amount data such that the chromatic color inks are largely used in the character inside area compared with the character contour area.

4 Claims, 7 Drawing Sheets

REAL BLACK LUT

FIG. 4B

COMPOSITE BLACK LUT

METHOD OF GENERATING INK AMOUNT DATA, DEVICE FOR GENERATING INK AMOUNT DATA, AND PROGRAM THEREOF

BACKGROUND

1. Technical Field

The present invention relates to a technology of printing a character with high quality in a printing apparatus.

2. Related Art

In a printing apparatus, various colors can be output by utilizing a combination of C-, M- and Y-color inks. For example, a blue color can be output by utilizing a C-color ink and an M-color ink, and a red color can be output by overlapping and outputting the M-color ink and a Y-color ink. In addition, a black color can be printed by overlapping the C-color ink, the M-color ink and the Y-color ink by the same amount. By utilizing the combination of the C-, M- and Y-color inks, various colors can be output.

Meanwhile, in such a printing apparatus, if a black character is printed by overlapping the C-, M- and Y-color inks, the amount of ink is large. Thus, the ink may be oozed and thus the character may be blurred. Therefore, a technology of printing a character without blurring by mounting a black color ink (K-color ink) in addition to C-, M- and Y-color inks and printing the character using only the K-color ink is developed (JP-A-10-200769).

However, if the character is printed using only the K-color ink, printing quality may deteriorate by revealing a background color of a printing sheet. That is, if printing is performed using only the K-color ink, since the ink amount is reduced compared with the case where the printing is performed using three-color inks of C, M and Y, when a hitting position of the ink is slightly deviated, the deviated part is not covered by the ink and the background color of the printing sheet remains. Accordingly, the background color of the printing sheet is revealed at some places of the character and thus printing quality may deteriorate. The K-color ink and the C-, M- and Y-color inks may be combined. However, in this case, since the C-, M- and Y-color inks are utilized, a character with blur impression is susceptible to be obtained. In addition, since the K-color ink is utilized, the hitting position of the ink may be deviated and thus printing quality may deteriorate. Accordingly, this is not an efficient solution.

SUMMARY

An advantage of some aspects of the invention is that it provides a technology of printing a black character with high quality.

In order to solve at least a part of the above-described problems, a method of generating ink amount data of the invention employs the following configuration.

According to an aspect of the invention, there is provided a method of generating ink amount data which is the used amounts of inks of respective colors when an image is printed, by analyzing image data of the image, the method including: extracting a character area, of which a saturation value is equal to or less than a predetermined value, from the image by analyzing the image data; dividing the character area into a character contour area which is a contour part of the character and a character inside area which is the inside of the character; and converting the image data of the character contour area and the image data of the character inside area into the ink amount data of at least one type of achromatic color ink and at least three types of chromatic color inks, wherein the converting of the ink amount data includes converting the image data of the areas into the ink amount data such that the chromatic color inks are largely used in the character inside area compared with the character contour area.

According to another aspect of the invention, there is provided a device for generating ink amount data which is the used amounts of inks of respective colors when an image is printed, by analyzing image data of the image, the device including: a character area extracting unit extracting a character area, of which a saturation value is equal to or less than a predetermined value, from the image by analyzing the image data; a character area dividing unit dividing the character area into a character contour area which is a contour part of the character and a character inside area which is the inside of the character; and an ink amount data converting unit converting the image data of the character contour area and the image data of the character inside area into the ink amount data of at least one type of achromatic color ink and at least three types of chromatic color inks, wherein the ink amount data converting unit includes converting the image data of the areas into the ink amount data such that the chromatic color inks are largely used in the character inside area compared with the character contour area.

In the method of generating the ink amount data and the device for generating the ink amount data of the invention, when the image data is analyzed and the character is extracted, the extracted character is divided into the contour area and the inside area. The extracted character is not limited to a complete black character and may be a character of which the saturation value is equal to or less than the predetermined value. For example, the character may be a slight gray character. When the character is divided into the contour area and the inside area, the image data of the contour area and the image data of the inside area are converted into the ink amount data. The image data of the areas is converted into the ink amount data such that the used amount of the chromatic color ink in the inside area is larger than the used amount of the chromatic color ink in the contour area.

When the character is printed on the basis of the ink amount data obtained by the above-described method, since the chromatic color ink is largely used in the character inside area, it is possible to sufficiently hide the background color of the printing sheet. In addition, since the used amount of chromatic color ink is small in the character contour area, the oozing of the ink can be avoided. In addition, since a contour having blur impression is prevented from being obtained due to the contour having a color, it is possible to print a clear contour. Accordingly, the inside of a character can be sufficiently painted and a character having a clear contour can be printed with high quality.

In the method of generating the ink amount data of the invention, a first correspondence table in which the ink amount data corresponds to lattice points of an RGB color solid may be stored and a second correspondence table in which the ink amount data of chromatic color inks corresponds to brightness values may be stored. As the brightness values, any value corresponding to the brightness of the image may be used, for example, a V gray level in a HSV color system, a Y gray level of an YCC color system, or a sum or an average of gray levels of the RGB components may be used. The ink amount data corresponding to the second correspondence table is the ink amount data in which the saturation value is equal to or less than the predetermined value by concurrently using a plurality of chromatic color inks when printing is performed. The image data is converted into the ink amount data by obtaining the RGB components and referring to the first correspondence table with respect to the character contour area, and by obtaining the brightness value and referring to the second correspondence table with respect to the character inside area.

Since the inside area can be printed using the plurality of chromatic color inks, the inside of the character can be sufficiently painted by the sufficient amount of inks. In contrast, with respect to the contour area, when the ink amount data corresponding to the RGB components of the contour area is converted by the first correspondence table, since the character has the low saturation value, the image data is converted into the ink amount data mainly composed of the achromatic color ink. Accordingly, in the contour area, the contour can be clearly printed without enabling the contour to have a color by the chromatic color inks or without oozing of the ink. Therefore, the inside of a character is sufficiently painted and a character having a clear contour can be printed with high quality.

In addition, in the first correspondence table, since the RGB components correspond to the ink amount data, a color image such as a photograph as well as a character can be converted into the ink amount data. With respect to image data in which a character and a color image are mixed, it is possible to generate ink amount data. In addition, if a correspondence table for a color image exists, since this is inversely used as the first correspondence table, a burden for storing the correspondence table is reduced and thus the ink amount data can be more easily acquired.

In the method of generating the ink amount data of the invention, lattice points (edge line lattice points) in a predetermined area including an edge line of the RGB color solid may correspond to brightness values of the second correspondence table. As the predetermined area including the edge line, a space adjacent to the edge line and including the edge line may be used, and, for example, a space surrounded by the edge line and the lattice points adjacent to the edge line or an area including nearer lattice points of the lattice points adjacent to the edge line may be used. In addition, the edge line lattice points of the first correspondence table correspond to the ink amount data of the second correspondence table on the basis of the correspondence relationship between the edge line lattice points and the brightness values such that a new correspondence table (synthetic correspondence table) is generated. In addition, the RGB components of the image data of the inside area are converted into the RGB components of the edge line lattice points corresponding to the brightness of the inside area on the basis of the correspondence relationship between the edge line lattice points and the brightness values. In addition, the image data after conversion is converted into the ink amount data by the synthetic correspondence table.

Since the inside area is converted into the RGB components of the edge line lattice points in the image data after conversion, the edge line lattice points in which the second correspondence table is embedded is referred to in the inside area and, as a result, the image data is converted into the ink amount data including the chromatic color inks corresponding to the second correspondence table. Therefore, the inside of the character can be sufficiently painted by the chromatic color inks. In contrast, in the contour area, since the image data is converted into the ink amount data mainly composed of the achromatic color ink due to the low saturation value of the character, the contour can be clearly printed. In addition, when being converted into the ink amount data, only the synthetic correspondence table is referred to. Since the correspondence table referred to by the contour area or the inside area does not need to be switched, the image data can be more easily converted into the ink amount data.

In the method of generating the ink amount data of the invention, a first brightness correspondence table in which the brightness values correspond to the ink amount data of the achromatic color ink and a second brightness correspondence table in which the brightness values correspond to the ink amount data of the chromatic color inks may be stored. The contour area may be converted into the ink amount data by obtaining the brightness value from the image data of the contour area and referring to the first brightness correspondence table and the inside area may be converted into the ink amount data by obtaining the brightness value from the image data of the inside area and referring to the second brightness correspondence table.

Since the contour area is converted into the ink amount data of the achromatic color ink by the first brightness correspondence table, the contour can be clearly printed using the achromatic color ink. In contrast, since the image data of the inside area is converted into the ink amount data of the chromatic color ink by the second brightness correspondence table, the inside of the character can be sufficiently painted using the chromatic color ink. As a result, the character of which the contour is clear and the inside is sufficiently painted can be printed with high quality. In addition, the first correspondence table and the second correspondence table are one-dimensional correspondence tables in which the ink amount data corresponds to the brightness values, the amount of stored contents may be small. Accordingly, a storage burden is reduced and thus the ink amount data can be more easily generated.

The invention can be realized using a computer by reading the program for performing the method of generating the ink amount data by the computer and executing predetermined functions. Accordingly, the invention includes the following aspect of the program. That is, according to another aspect of the invention, there is provided a program for performing a method of generating ink amount data which is the used amounts of inks of respective colors when an image is printed, by analyzing image data of the image using a computer, the program including: a character area extracting function which extracts a character area, of which a saturation value is equal to or less than a predetermined value, from the image by analyzing the image data; a character area dividing function which divides the character area into a character contour area which is a contour part of the character and a character inside area which is the inside of the character; and an ink amount data converting function which converts the image data of the character contour area and the image data of the character inside area into the ink amount data of at least one type of achromatic color ink and at least three types of chromatic color inks, wherein the ink amount data converting function converts the image data of the areas into the ink amount data such that the chromatic color inks are largely used in the character inside area compared with the character contour area.

When this program is read by the computer and the functions are executed, it is possible to acquire the ink amount data which can print the character with high quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in the following order, in order to clarify the contents of the invention.
A. Apparatus Configuration:
B. Printing Process:
C. Modified Example:

A. APPARATUS CONFIGURATION

Figure 1:
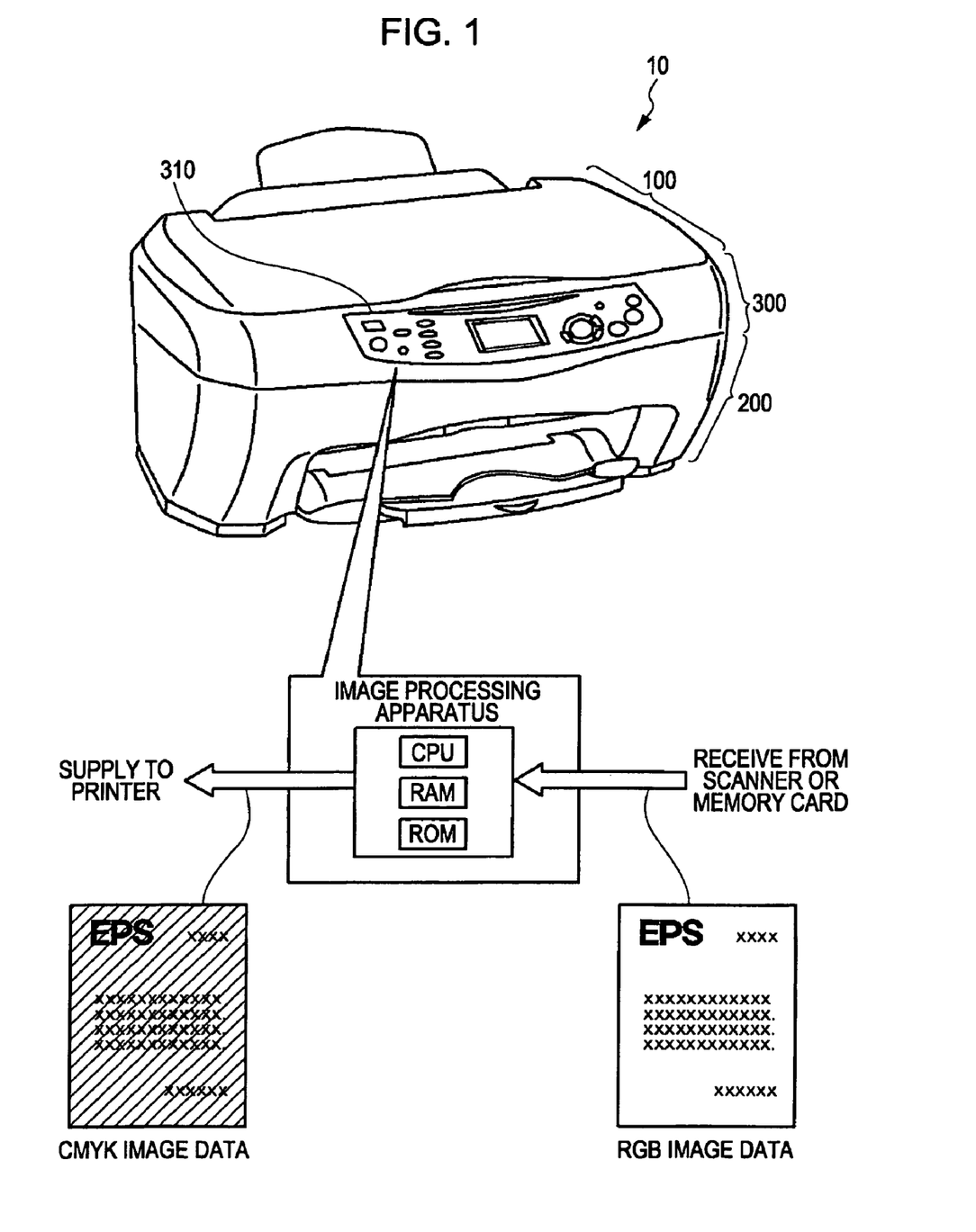
FIG. 1 is a view showing a printing apparatus in which an image processing device of an embodiment of the invention is mounted.

FIG. 1 is a perspective view showing a printing apparatus 10 in which an image processing device of an embodiment of the invention is mounted. As shown, the printing apparatus 10 includes a scanner unit 100, a printer unit 200, and a control unit 300 for controlling the operation of the scanner unit 100 and the printer unit 200. The scanner unit 100 has a scanner function for reading a printed image and generating image data, and the printer unit 200 has a printer function for receiving image data and printing an image on a printing medium. In addition, when the image read by the scanner unit 100 is output from the printer unit 200, a copy function can be realized. That is, the printing apparatus 10 of the present embodiment is a "so-called" scanner/printer/copy multifunctional apparatus for solely realizing the scanner function, the printer function and the copy function.

The control unit 300 includes a CPU, a ROM and a RAM mounted therein, can perform predetermined image processing with respect to image data read from the scanner unit 100 or image data read from a recording medium such as a memory card, and can print an image with a higher quality by performing such image processing, in addition to the control of the scanner unit 100 or the printer unit 200. For example, when a document is printed, image processing for printing a character with high quality can be performed without causing a problem including the deterioration of printing quality such as blur of the contour of a character or thinning of a character.

FIG. 1 conceptually shows a state in which the image processing device of the present embodiment is mounted in the printing apparatus 10. As shown, the image processing device of the present embodiment includes the CPU, the ROM and the RAM mounted in the control unit 300, and the controller 300 uses the RAM or the like such that the function of the image processing device is realized. The control unit 300 receives image data and color-converts the image data into CMYK image data by referring to a color conversion LUT stored in the ROM. The CMYK image data is image data including a CMYK gray level corresponding to the used amounts of C-, M-, Y- and K-color inks used for printing. The CMYK image data is supplied to the printer unit 200 such that an image can be printed by the C-, M-, Y- and K-color inks.

The image processing device of the present invention acquires the CMYK gray level for printing a character with high quality by performing a special process with respect to a character included in an image and thus prints the character with high quality. Hereinafter, the process performed by the control unit 300 will be described in detail.

B. PRINTING PROCESS

Figure 2:
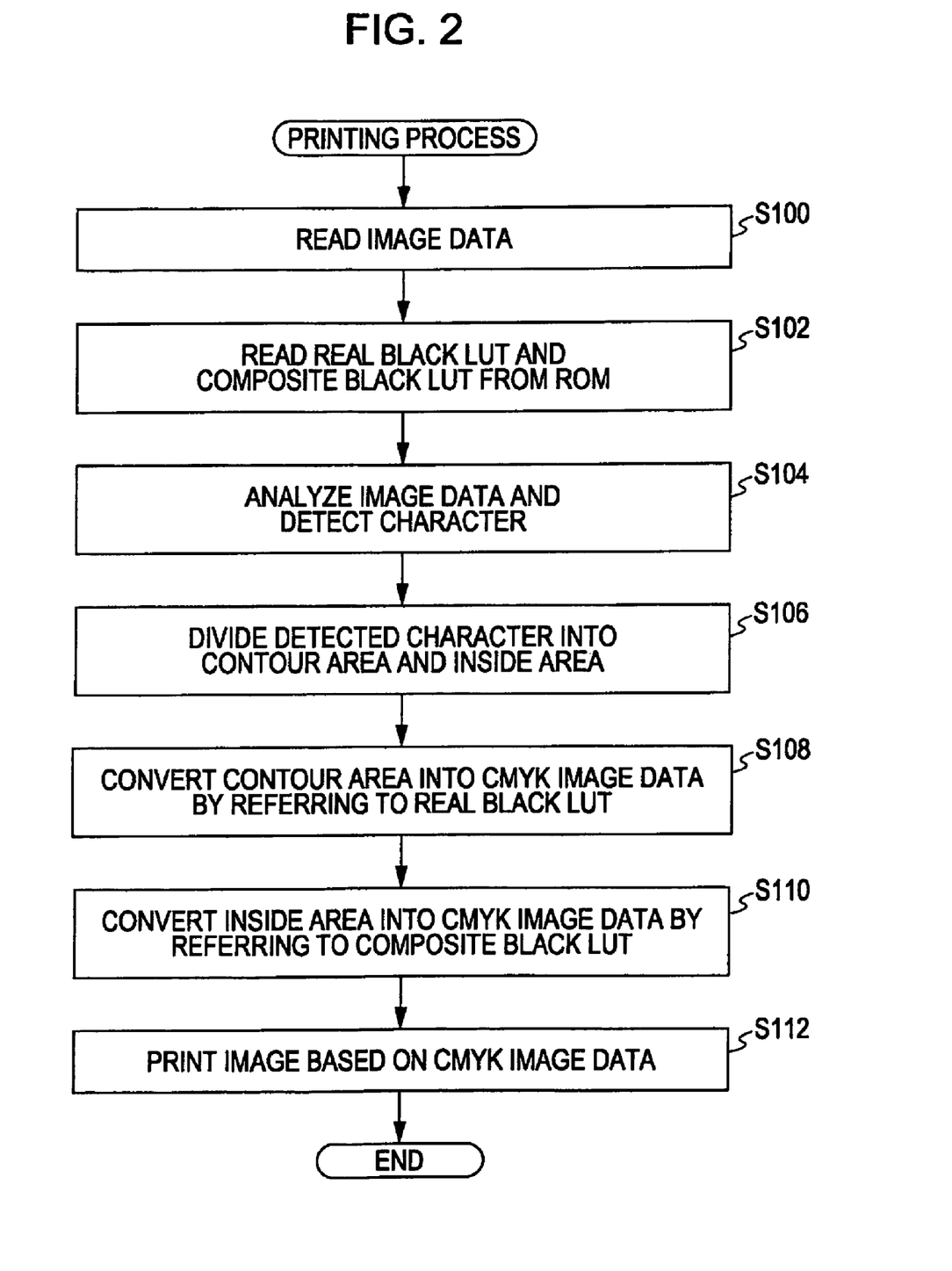
FIG. 2 is a flowchart showing the flow of a printing process of an embodiment of the invention.
Figure 3:
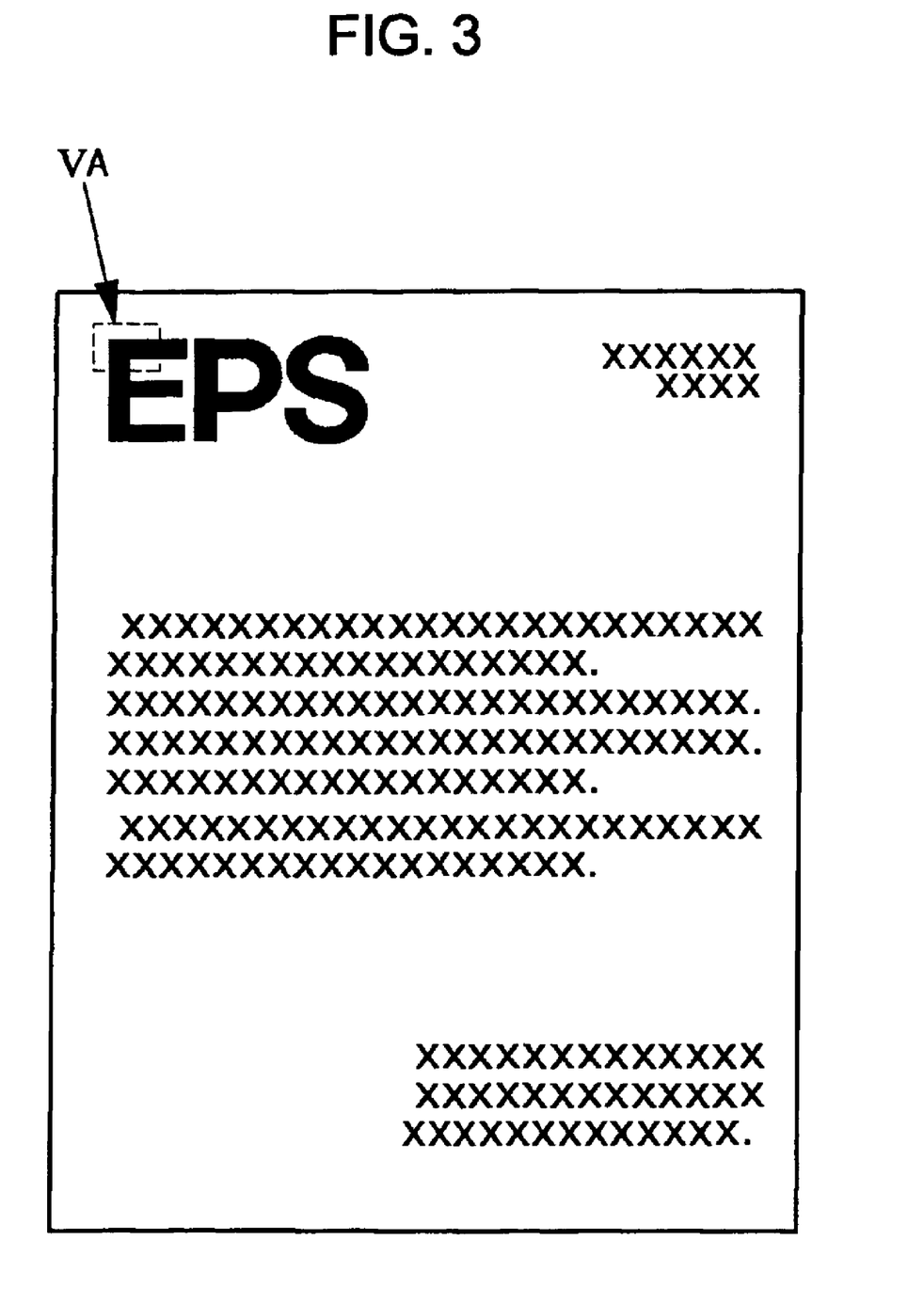
FIG. 3 is a view showing image data of a document printed by the printing process of the embodiment of the invention.

FIG. 2 is a flowchart showing the flow of a printing process of an embodiment of the invention. Such a process is performed by the control unit 300 when a user operates an operation panel 310 and sends an instruction for starting printing. When the printing process is started, the control unit 300 first performs a process of reading image data to be printed (step S100). In the present embodiment, the image data of a document shown in FIG. 3 is read. In addition, the image data of such a document may be prepared by word processing soft of a computer or may be generated by reading an original by the scanner unit 100 of the printing apparatus 10. In addition, in the present embodiment, the read image data is RGB image data represented by gray levels of components of R, G and B.

When the image data is read, in order to color-convert the read image data into the CMYK image data used for printing, a process of reading a correspondence table (a color conversion LUT) used for the color conversion is performed (step S102 of FIG. 2). In the printing apparatus 10 of the present embodiment, as the color conversion LUT for color conversion of a character of a document, two color conversion LUTs including a "real black LUT" used for conversion of a contour part and a "composite black LUT" used for conversion of a part excluding the contour part are stored in the ROM. Here, the two color conversion LUTs are read.

Figure 4A:
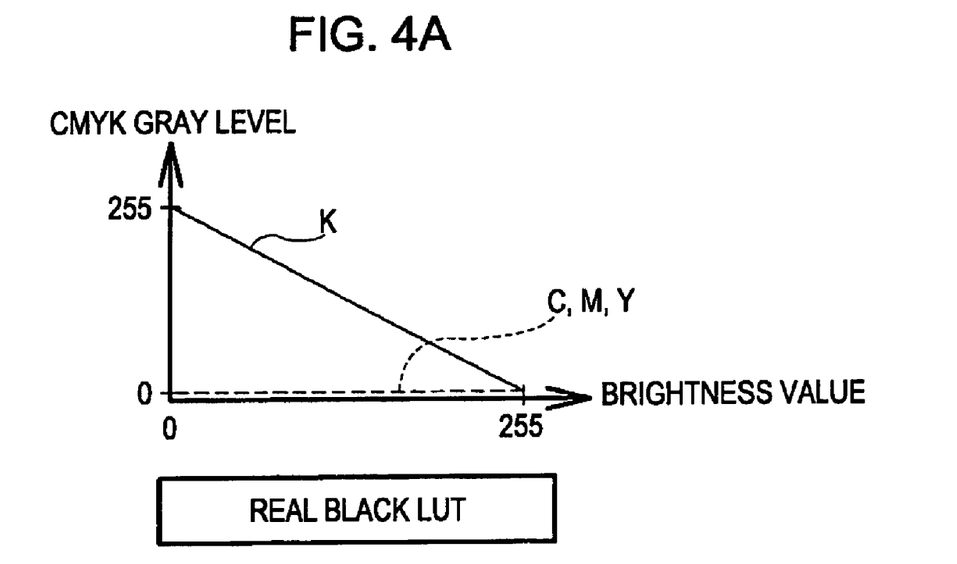
FIG. 4 is a view showing a real black LUT and a composite black LUT.

FIG. 4 is a view showing the two read color conversion LUTs. FIG. 4A shows the "real black LUT". As shown, the real black LUT is a correspondence table in which gray levels (a vertical axis of a graph) of C, M, Y and K correspond to a brightness value (a horizontal axis of the graph of the figure). The gray levels of C, M, Y and K used for printing of the character can be obtained by obtaining the brightness value of the character of the image data and referring to the real black LUT. In the real black LUT, as shown, all the gray levels of C, M and Y of the gray levels of C, M, Y an K are set to "0" and only the gray level of K is set to a gray level having a predetermined value. Accordingly, when the real black LUT is referred to, the black color of the character can be converted into a black color (that is, real black) composed of only the K component.

Figure 4B:
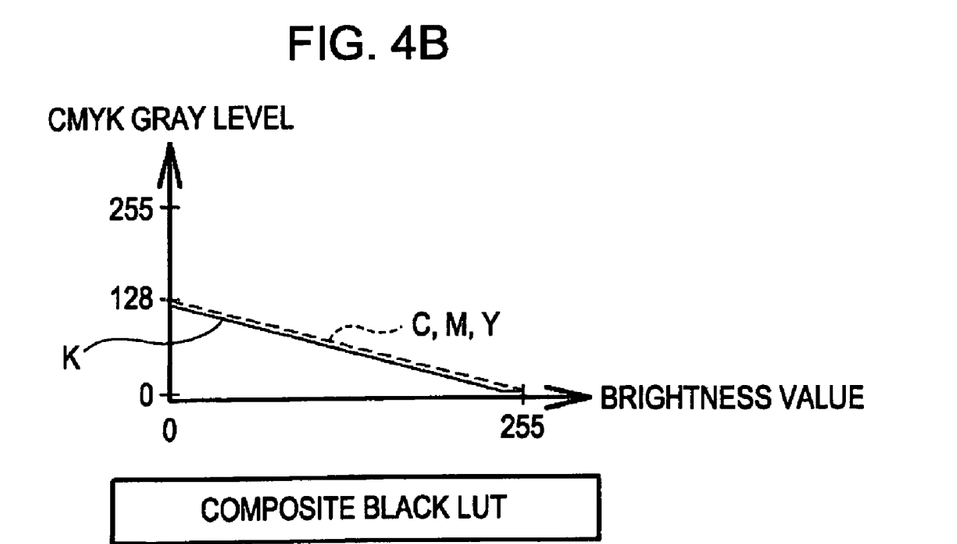

Meanwhile, FIG. 4B shows the "composite black LUT". In the composite black LUT, similar to the real black LUT, the gray levels of C, M, Y and K can correspond to the brightness value and the gray levels of the C, M, Y and K used for printing can be obtained by referring to the correspondence relationship. In the composite black LUT, as shown, the gray levels of C, M and Y as well as the gray level of K are set to have predetermined values. Accordingly, by referring to the composite black LUT, the black color of the character can be converted into a black color (that is, composite black) including the components of C, M and Y.

When the two color conversion LUTs are read, in order to apply the color conversion LUTs to the character of the image data, a process of analyzing the read image data and detecting a black character is performed (step S104 of FIG. 2). When the black character is detected, various methods can be used. For example, the shape of a character to be detected is previously stored, the image data is analyzed, and a target having the same shape of the character is searched from the image. Alternatively, more simply, the RGB gray levels of the pixels of the image data may be examined and pixels having the RGB value corresponding to the black color of the character may be selected. The character can be detected by such various methods.

When the character is detected, a process of dividing the detected character into a contour part and an inside part of the contour is performed (step S106). Although described in detail later, in the printing process of the present embodiment, the extracted character is divided into the contour part and the inside part instead of being treated without change such that the character can be printed with high quality. This will be described in detail later. In order to divide the character into the contour part (contour area) and the inside part (inside area), various method may be used. However, if the following method is used, the character can be simply divided.

Figure 5A:
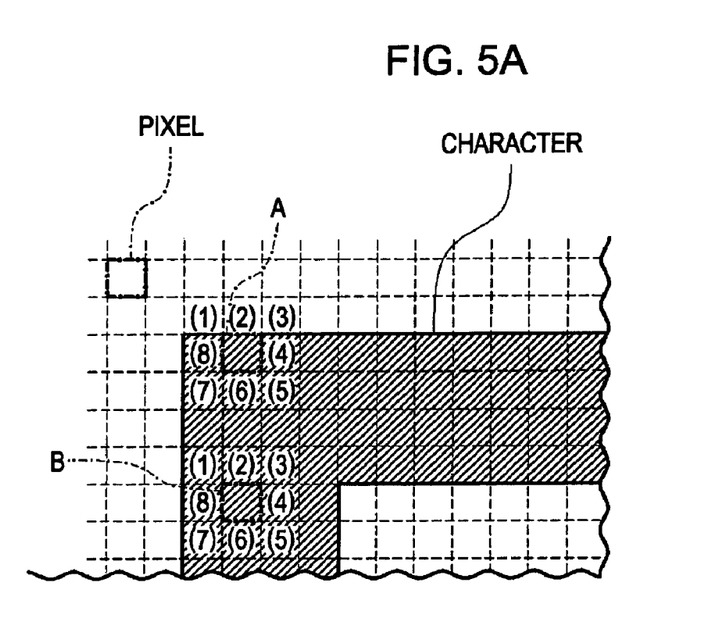
FIG. 5 is a view showing a state in which a character is divided into a contour area and an inside area.

FIG. 5 is a view showing a state in which the character is divided into the contour area and the inside area. FIG. 5A is an enlarged view of a part "VA" in the image of FIG. 3, and a part of the character "E" drawn in the part "VA" is hatched. In addition, a rectangle denoted by a broken line of the figure shows each pixel of the image data.

Figure 5B:
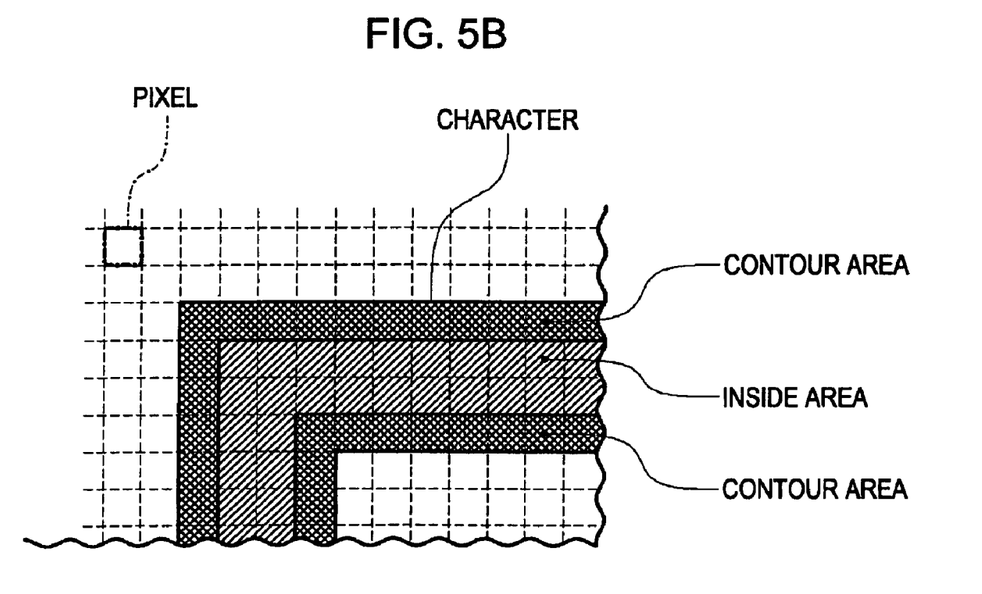

In order to divide the character into the contour area and the inside area, it is examined whether or not all pixels located in the periphery of a pixel are the pixels of the character with respect to each of the pixels (the hatched pixels of the figure) of the detected character. If all the peripheral pixels are the pixels (the hatched pixels) of the character, it may be determined that the pixels are the inside pixels of the character and, if the pixels (non-hatched pixels) other than the character are present, it may be determined that the pixels are the pixels of the contour part. For example, it may be determined that the pixel denoted by "A" of the figure is the pixel of the contour part, as shown, since the pixels (three pixels from (1) to (3) other than the pixels of the character are present in the pixels (pixels (1) to (8) of the figure) surrounding "A". In addition, it may be determined that the inside pixel of the character denoted by "B" is the inside pixel of the character, since all the pixels (1) to (8) surrounding "B" are pixels (hatched pixels) of the character. FIG. 5B shows the result of determining all the pixels of the character. In the figure, the parts denoted by cross hatching are the parts which are determined to be the contour area and the parts denoted by hatching are the parts which are determined to be the inside area. When the pixels of the character are examined one by one, the character can be divided into the contour area and the inside area. In addition, although FIG. 5 shows the case where the contour area having a width corresponding to one pixel is extracted, the contour area having a width corresponding to two pixels may be extracted. For example, the contour area having the width corresponding to the two pixels can be extracted by extracting the contour area having the width corresponding to one pixel and then extracting the contour area having the width corresponding to one pixel with respect to the remaining inside area.

In addition to such methods, the character may be divided into the contour area and the inside area using another method. For example, the character may be divided using a method of detecting an edge. In the method of detecting the edge, since a part in which a gray level is significantly changed can be detected as the edge, if this method is applied to the character, it is possible to detect the contour part in which the gray level is significantly changed between the inside (black color or the like) of the character and the outside (white color or the like) of the character. In contrast, since the gray level is hardly changed in the inside of the character, the inside of the character is not detected even when the method of detecting the edge is applied. Therefore, since only the contour of the character is detected and the inside of the character is not detected, as a result, the character can be divided into the contour area and the inside area. Accordingly, the character can be easily divided into the contour area and the inside area by using the method of detecting the edge.

When the character is divided into the contour area and the inside area using various methods, the contour area and the inside area are converted into the CMYK gray levels, respectively. First, the contour area is converted into the CMYK gray level by referring to the real black LUT (step S108 of FIG. 2). In contrast, the inside area is converted into the CMYK gray level by referring to the composite black LUT (step S110).

When the contour area and the inside area are respectively converted into the CMYK gray levels, the CMYK image data obtained by conversion is supplied to the printer unit 200. The printer unit 200 receives the CMYK image data and outputs the C-, M-, Y- and K-color inks on the basis of the CMYK image data, thereby printing the image (step S112). When the printer unit 200 prints the image, the control unit 300 completes the printing process of FIG. 2.

As described above, in the printing process of the present embodiment, the character is divided into the contour area and the inside area, the areas are respectively converted into the CMYK gray levels, and the image is printed on the basis of the obtained CMYK image data. In addition, in the printing process of the present embodiment, the character can be printed with high quality by dividing the character into the contour area and the inside area. This will be described in detail with reference to FIG. 6.

Figure 6:
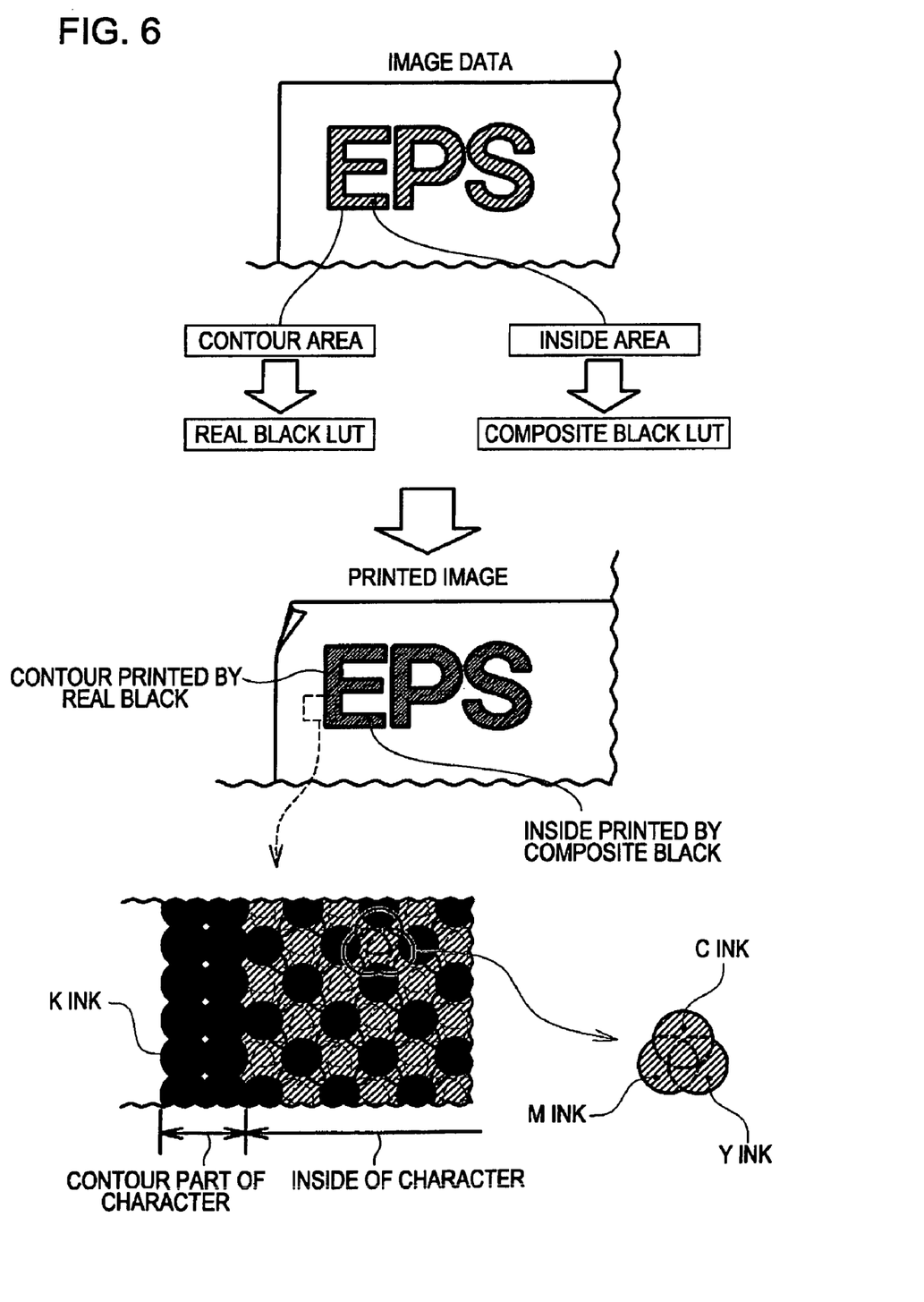
FIG. 6 is a view showing a state in which a character can be printed with high quality by the printing process of the embodiment of the invention.

FIG. 6 is a view conceptually showing a state in which a character can be printed with high quality by the printing process of the embodiment of the invention. Image data of a document to be printed is shown in the upper side of FIG. 6. As described above, in the printing process of the present embodiment, the character of the document is divided into the contour area and the inside area, the contour area is color-converted into the CMYK gray level by referring to the real black LUT, and the inside area is color-converted into the CMYK gray level by referring to the composite black LUT. An image printed on the basis of the obtained CMYK gray levels is shown in the intermediate side of FIG. 6. In the real black LUT which is referred to by the contour area, since the CMYK gray level is set such that only the gray level of K has the predetermined value (see FIG. 4A), the contour part of the character is printed using only the K-color ink. In contrast, the composite black LUT which is referred to by the inside area, since the CMYK gray level is set such that the gray levels of C, M and Y as well as the gray level of K have predetermined values (see FIG. 4B), the inside of the character is printed using the C-, M-, Y- and K-color inks (see the intermediate side of FIG. 6).

The lower side of FIG. 6 shows a state in which a part of the printed character is enlarged. As shown, since the contour part of the character is printed using only the K-color ink, the character is clearly printed without oozing the contour due to a large amount of ink. In addition, since ink dots having the colors of C, M and Y are not formed in the contour part, blur impression does not appear while the contour is prevented from being viewed to have a color. Thus, the contour can be printed with high quality and clear impression. In contrast, in the inside of the character, as shown, since the C-, M- and Y-color inks are used in addition to the K-color ink, as shown, the background color of the printing sheet is substantially covered by sufficient amount of inks. Accordingly, the character can be printed with the sufficient black color while the quality of the character is prevented from deteriorating due to a conspicuous background color. By the printing process of the present embodiment, the contour becomes clear and the character of which the inside has a sufficient black color can be printed with high quality.

In addition, in the printing process of the present embodiment, since the inside of the character can be printed by the sufficient amount of inks, the printing can be more rapidly performed. That is, in order to more rapidly perform the printing, the resolution of the printing is set to be low (one pixel is large) and thus, when one ink dot is formed in each pixel, a distance between dots is increased. As a result, even when the hitting position of the ink is slightly deviated, the background color of the part appears and printing quality deteriorates. In contrast, in the printing apparatus of the present embodiment, since the inside of the character is printed using the C-, M-, Y- and K-color inks, a large amount of ink dots is formed. Even when the hitting position of the ink is slightly deviated, the background color of the sheet does not appear. Accordingly, the printing can be rapidly performed. Even when the printing is rapidly performed, since the contour is printed by the real black, the character of which the contour is clear can be printed with high quality.

In addition, in the printing process of the present embodiment, since the character is only divided into the contour area and the inside area and high image analysis is not performed, the character can be rapidly printed with high quality. That is, the process of dividing the character into the contour and the inside can be performed by the method described using FIG. 5 or the simple method such as the method of detecting the edge. Thus, the high image analysis does not need to be performed. Accordingly, the printing can be rapidly performed while the printing is prevented from being delayed due to the time consumed for the image analysis. In addition, since the high image analysis is not required, the configuration of the apparatus can be simplified.

In addition, in the printing process of the present embodiment, even when an error occurs in determination when the character is divided into the contour area and the inside area, the character can be adequately printed without immediately making the character unnatural. For example, if erroneous determination occurs in the image analysis such that it is erroneously determined that the contour part is the inside area, the contour which should be printed using the real black is printed using the composite black. However, even in this case, since the character having a color and brightness which are largely different from those of the black color of the original character is not printed, the image is not immediately made unnatural. Accordingly, even when the erroneous determination occurs, the character can be appropriately printed. In addition, the process of dividing the character into the contour area and the inside area can be simplified and more rapidly performed.

In addition, although the image data of the document is printed in the present embodiment (see FIG. 3), the black character can be printed with high quality with respect to, for example, an image in which a black character such as a text and a color image such as a photograph are mixed, in addition to the document. That is, if such an image is printed, the black character is detected from the image and the residual color image part is converted into a CMYK gray level using a general color conversion LUT in which the CMYK gray level corresponds to the RGB gray level. In addition, the contour of the detected character is converted into the CMYK gray level by referring to the real black LUT and the inside thereof is converted into the CMYK gray level by referring to the composite black LUT. Since the color image part can be converted into the adequate CMYK gray level by the general color conversion LUT and the character part can be converted into the CMYK gray level for printing the character with high quality similar to the present embodiment, both the color image and the character can be printed with high quality.

C. MODIFIED EXAMPLE

In the above-described embodiment, the two color conversion LUTs for the character including the real black LUT and the composite black LUT are prepared, the contour area of the character is converted into the real black, and the inside area is converted into the composite black. However, instead of preparing the two color conversion LUT for the character, the color conversion can be more simply performed by embedding the composite black LUT in a part of the general color conversion LUT and using the LUT. Hereinafter, the modified example of performing the color conversion by such a method will be described.

Figure 7:
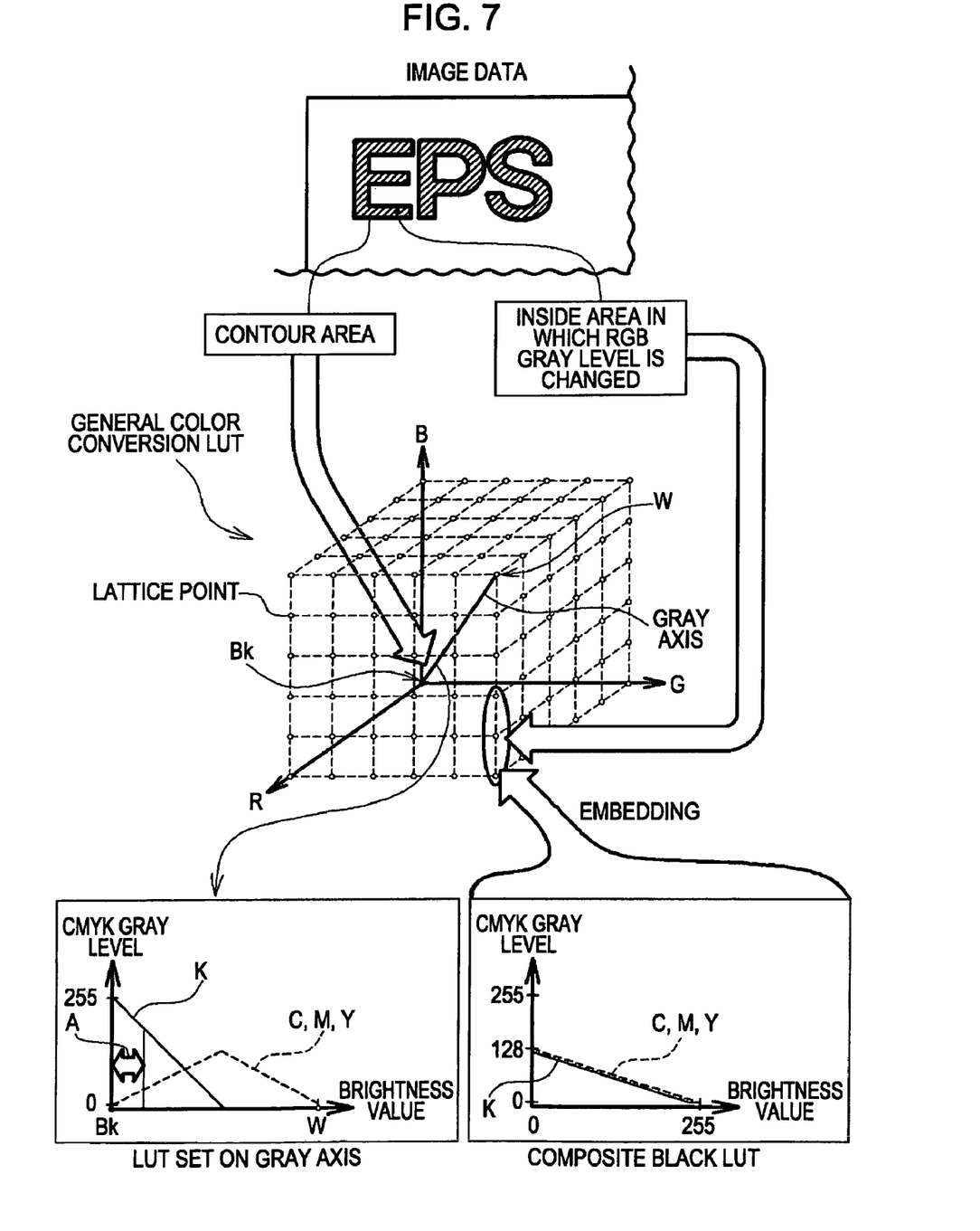
FIG. 7 is a conceptual view showing a color conversion of a modified example of a color conversion LUT in which a composite black LUT is embedded.

FIG. 7 is a conceptual view showing in a state in which a color conversion is performed by embedding a composite black LUT in a color conversion LUT. In the intermediate side of the figure, a general color conversion LUT is shown. As shown, in the general color conversion LUT, a plurality of lattice points is provided in a three-dimensional coordinate space whose coordinate axes are components of R, G and B and CMYK gray levels set in the lattice points. In addition, the RGB gray level of the image data can be color-converted into the CMYK gray level by reading the CMYK gray level from the lattice corresponding to the RGB gray level of the image data.

In the color conversion LUT, the CMYK gray levels are set in the plurality of lattice points, but a lattice point which is not actually used so much exists in the lattice points. For example, since it is difficult for the gray levels of R, G and B of the image data to have extreme values such as a maximum value or a minimum value, the lattice point corresponding to the maximum value or the minimum value is not used so much. In addition, there is a stronger tendency that the lattice point of a part (an edge line of a cube in the figure) in which two of the components of R, G and B become the maximum value or the minimum value is not used. Accordingly, in the present modified example, instead of the CMYK gray level of the latticed point which is not used, the CMYK gray level of the composite black LUT is set. That is, the CMYK gray level set to the lattice point of the part which is not used is replaced with the CMYK gray level set to the composite black LUT such that the composite black LUT is embedded in the part of the color conversion LUT. The place where the composite black LUT is embedded is not limited if it is the edge line of the color conversion LUT. In the example of FIG. 7, the composite black LUT is embedded in the edge line in which the R component and the G component become the maximum value (see the right lower side of FIG. 7).

If the composite black LUT is embedded, the image data of the inside area is corrected such that the part in which the inside area of the character is embedded is referred to at the time of the color conversion. That is, the RGB gray level of the inside area of the character is converted into the RGB gray level of the part in which the composite black LUT is embedded. Since the color conversion can be performed by referring to the part in which the composite black LUT is embedded, the inside area of the character can be converted into the composite black.

Meanwhile, if the color conversion is performed using the general color conversion LUT itself, the contour area of the character can be converted into real black. That is, if the character is color-converted using the color conversion LUT, since the character substantially has a complete black color, a lattice point (a lattice point denoted by "Bk" of the figure) corresponding to the complete black color on a gray axis is referred to or the vicinity of the lattice point "Bk" on the gray axis is referred to. Then, as shown in the lower left side of FIG. 7, only the gray level of K is set to a large value in the lattice point "Bk" on the gray axis of the color conversion LUT and the vicinity (a part denoted by "A" of the figure) thereof and the gray levels of C, M and Y are set to a small value. Accordingly, the contour area of the character can be converted into the CMYK gray level composed of only the K component. Therefore, the contour area of the character can be converted into the CMYK gray level which is substantially equal to the real black.

If the color conversion LUT in which the composite black LUT is embedded is used, the inside area of the character can be converted into the CMYK gray level of the composite black by the embedded composite black LUT, and the contour area of the character can be converted into the CMYK gray level, which is substantially equal to the real black, using the part of the color conversion LUT. Accordingly, the contour can be clearly printed in the real black and the character of which the inside is sufficiently painted can be printed with high quality.

In addition, if the color conversion is performed by the method of this modified example, the color conversion can be more rapidly performed. That is, if the composite black LUT is embedded, since the color conversion is performed using only the embedded color conversion LUT as for the rest, the real black LUT and the composite black LUT do not need to be switched according to the contour area and the inside area at the time of the color conversion. Accordingly, the color conversion can be rapidly performed without complicating the process at the time of the color conversion. Since hardware for switching the real black LUT and the composite black LUT is not required, the configuration of the apparatus can become more simplified.

Although the image processing apparatus of the present embodiment is described, the invention is not limited to the above-described embodiment and the modified example and may be variously modified without departing from the scope of the invention.

What is claimed is:

1. A method of generating ink amount data which is the used amounts of inks of respective colors when an image is printed, by analyzing image data of the image, the method comprising:
   extracting a character area, having a predetermined color, from the image by analyzing the image data;
   dividing the character area into a character contour area which is a contour part of the character and a character inside area which is the inside of the character;
   converting the image data of the character contour area and the image data of the character inside area into the ink amount data of at least one type of achromatic color ink and at least three types of chromatic color inks;
   setting a plurality of lattice points in an RGB color solid defined by gray level ranges of RGB components of RGB image data and storing a first correspondence table in which the lattice points correspond to the ink amount data of the at least one type of achromatic color ink and the at least three types of chromatic color inks;
   storing a second correspondence table in which a plurality of brightness values which is previously selected corresponds to the ink amounts data of the at least three types of chromatic color inks, which results in the predetermined color by concurrent use thereof;
   storing a predetermined correspondence relationship in which edge lattice points which are the lattice points in a predetermined area including an edge line in which two of the RGB components become an upper limit or a lower limit corresponds to the brightness values of the second correspondence table in the RGB color solid;
   generating a synthetic correspondence table in which the second correspondence table is embedded in the edge lattice points of the first correspondence table by enabling the brightness values of the second correspondence table to correspond to the edge lattice points according to the correspondence relationship; and
   generating corrected image data, in which the character inside area is corrected, by converting the RGB components of the image data into the RGB components of the edge lattice points which correspond to the brightness values obtained from the image data by the correspondence relationship, with respect to the image data of the character inside area,
   wherein the converting of the ink amount data includes converting the image data of the areas into the ink amount data such that the chromatic color inks are largely used in the character inside area compared with the character contour area;
   the converting of the ink amount data includes converting the image data into the ink amount data by obtaining the brightness value from the image data and referring to the second correspondence table with respect to the image data of the character inside area, and by obtaining RGB components from the image data and referring to the first correspondence table with respect to the image data of the character contour area; and
   the converting of the ink amount data includes converting the corrected image data into the ink amount data by referring to the synthetic correspondence table.

2. The method according to claim 1, further comprising:
   storing a first brightness correspondence table in which the ink amount data of the at least one type of achromatic color ink corresponds to the brightness value of the image; and
   storing a second brightness correspondence table in which the ink amount data of the at least three types of chromatic color inks, which results in the predetermined color by concurrent use thereof, corresponds to the brightness value,
   wherein the converting of the ink amount data includes converting the image data into the ink amount data by obtaining the brightness value from the image data and referring to the first brightness correspondence table with respect to the image data of the character contour area and by obtaining the brightness value from the image data and referring to the second brightness correspondence table with respect to the image data of the character inside area.

3. A device for generating ink amount data which is the used amounts of inks of respective colors when an image is printed, by analyzing image data of the image, the device comprising:
   a character area extracting unit extracting a character area, having a predetermined color, from the image by analyzing the image data;
   a character area dividing unit dividing the character area into a character contour area which is a contour part of the character and a character inside area which is the inside of the character;

an ink amount data converting unit converting the image data of the character contour area and the image data of the character inside area into the ink amount data of at least one type of achromatic color ink and at least three types of chromatic color inks;

a lattice point setting unit setting a plurality of lattice points in an RGB color solid defined by gray level ranges of RGB components of RGB image data and storing a first correspondence table in which the lattice points correspond to the ink amount data of the at least one type of achromatic color ink and the at least three types of chromatic color inks;

a table storing unit storing a second correspondence table in which a plurality of brightness values which is previously selected corresponds to the ink amount data of the at least three types of chromatic color inks, which result in the predetermined color by concurrent use thereof;

a correspondence storing unit storing a predetermined correspondence relationship in which edge lattice points which are the lattice points in a predetermined area including an edge line in which two of the RGB components become an upper limit or a lower limit correspond to the brightness values of the second correspondence table in the RGB color solid;

a correspondence generating unit generating a synthetic correspondence table in which the second correspondence table is embedded in the edge lattice points of the first correspondence table by enabling the brightness values of the second correspondence table to correspond to the edge lattice points according to the correspondence relationship; and an image data generating unit generating corrected image data, in which the character inside area is corrected, by converting the RGB components of the image data into the RGB components of the edge lattice points which correspond to the brightness values obtained from the image data by the correspondence relationship, with respect to the image data of the character inside area, wherein the ink amount data converting unit includes converting the image data of the areas into the ink amount data such that the chromatic color inks are largely used in the character inside area compared with the character contour area;

the converting of the ink amount data includes converting the image data into the ink amount data by obtaining the brightness value from the image data and referring to the second correspondence table with respect to the image data of the character inside area, and by obtaining RGB components from the image data and referring to the first correspondence table with respect to the image data of the character contour area; and the converting of the ink amount data includes converting the corrected image data into the ink amount data by referring to the synthetic correspondence table.

4. A non-transitory computer-readable medium having a program stored thereon for performing a method of generating ink amount data which is the used amounts of inks of respective colors when an image is printed, by analyzing image data of the image using a computer, the program comprising:

a character area extracting function which extracts a character area, having a predetermined color, from the image by analyzing the image data;

a character area dividing function which divides the character area into a character contour area which is a contour part of the character and a character inside area which is the inside of the character;

an ink amount data converting function which converts the image data of the character contour area and the image data of the character inside area into the ink amount data of at least one type of achromatic color ink and at least three types of chromatic color inks;

a lattice point setting function setting a plurality of lattice points in an RGB color solid defined by gray level ranges of RGB components of RGB image data and storing a first correspondence table in which the lattice points correspond to the ink amount data of the at least one type of achromatic color ink and the at least three types of chromatic color inks;

a table storing function storing a second correspondence table in which a plurality of brightness values which is previously selected corresponds to the ink amount data of the at least three types of chromatic color inks, which results in the predetermined color by concurrent use thereof;

a correspondence storing function storing a predetermined correspondence relationship in which edge lattice points which are the lattice points in a predetermined area including an edge line in which two of the RGB components becomes an upper limit or a lower limit correspond to the brightness values of the second correspondence table in the RGB color solid;

a correspondence generating function generating a synthetic correspondence table in which the second correspondence table is embedded in the edge lattice points of the first correspondence table by enabling the brightness values of the second correspondence table to correspond to the edge lattice points according to the correspondence relationship; and an image data generating function generating corrected image data, in which the character inside area is corrected by converting the RGB components of the image data into the RGB components of the edge lattice points which correspond to the brightness values obtained from the image data by the correspondence relationship, with respect to the image data of the character inside area, wherein the ink amount data converting function converts the image data of the areas into the ink amount data such that the chromatic color inks are largely used in the character inside area compared with the character contour area;

the converting of the ink amount data includes converting the image data into the ink amount data by obtaining the brightness value from the image data and referring to the second correspondence table with respect to the image data of the character inside area, and by obtaining RGB components from the image data and referring to the first correspondence table with respect to the image data of the character area; and the converting of the ink amount data includes converting the corrected image data into the ink amount data by referring to the synthetic correspondence table.

\* \* \* \* \*